Nov. 3, 1931.  F. C. BLAKE  1,829,734
METHOD OF AND APPARATUS FOR EFFECTING SYNTHESIS
Filed Oct. 26, 1925
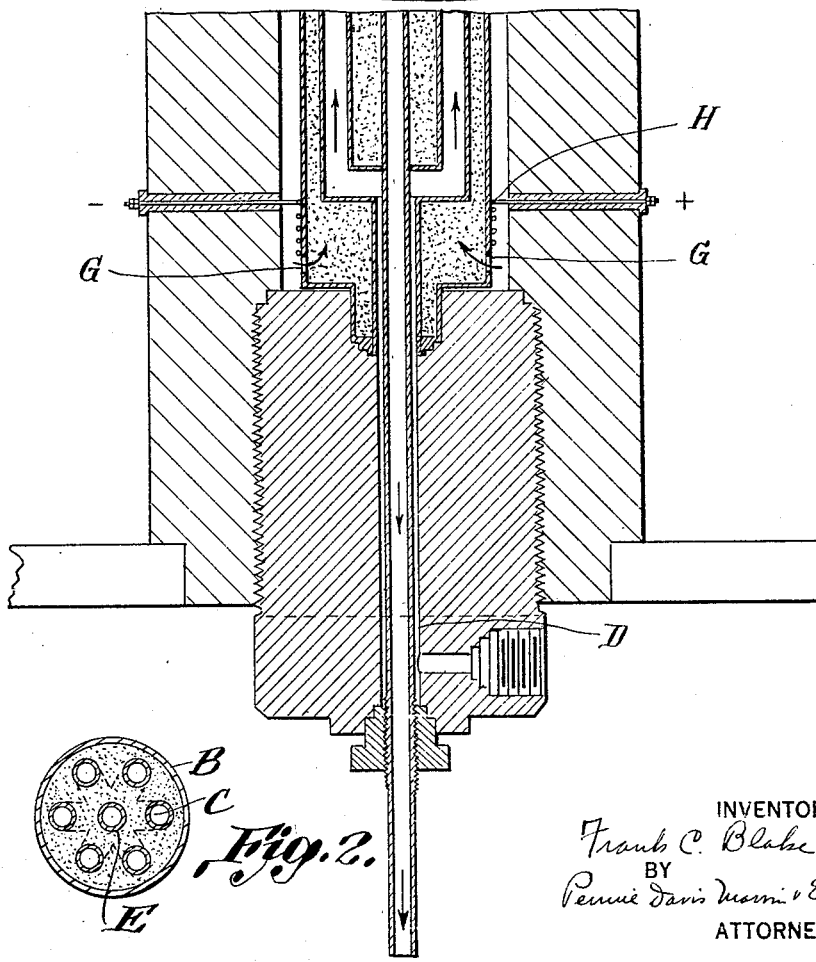

Patented Nov. 3, 1931

1,829,734

UNITED STATES PATENT OFFICE

FRANK C. BLAKE, OF WILMINGTON, DELAWARE, ASSIGNOR TO DU PONT AMMONIA CORPORATION, OF WILMINGTON, DELAWARE, A CORPORATION OF DELAWARE

METHOD OF AND APPARATUS FOR EFFECTING SYNTHESIS

Application filed October 26, 1925. Serial No. 64,725.

This invention relates to an improved method of and apparatus for effecting catalytic exothermic gaseous reactions.

It is recognized that in carrying out catalytic exothermic gaseous reactions, particularly those of the type which, like the synthesis of ammonia, and other syntheses employing hydrogen, are carried out under pressure, means must be provided for removing heat from the catalyst; otherwise the temperature of the catalyst will rapidly rise to values at which the physical form or activity of the catalyst may be unfavorably affected; the reaction equilibrium may be changed in such a way as to result in a lower conversion of the reacting gases; and/or undesirable side reactions may be accelerated.

The problem of removal of heat from the catalyst is complicated by the fact that the evolution of heat is by no means uniform throughout the body of catalyst. I have observed, for example, that in an apparatus for the synthesis of ammonia, in which the gases first contacted with the catalyst at a temperature of about 600° C., the temperature, during passage through the first 7 per cent. of the catalyst tube, rose rapidly to a maximum of about 700° C. This temperature was substantially maintained through the next 15 per cent. of the tube, but then fell off at a fairly constant rate until, on leaving the catalyst, the temperature of the gases was only about 400° C. From the standpoint of temperature distribution the catalyst may, therefore, be considered as consisting of three zones: (1) a small zone in which the temperature rises; (2) a somewhat larger zone in which a major portion of the reaction occurs with the temperature rapidly increasing to a maximum; (3) a comparatively large zone in which the temperature falls and the conversion may be relatively small.

Assuming that the gases as they first contact with the catalyst are not hot enough for the reaction to actively begin, as they flow in contact with the catalyst, the gases will at first react relatively slowly until the heat evolved has raised their temperature to a value at which the reaction will actively begin. This point in the catalyst marks the end of the first zone. Now, if it is remembered that a rise in temperature increases the velocity but is unfavorable to the equilibrium of an exothermic reaction, it will be seen that in the next portions of the catalyst with which the gases contact the reaction will take place with evolution of heat and more and more rapidly until a balance is established between the temperature attained and the equilibrium conversion corresponding to that temperature, which may be high enough to result in one or more of the unfavorable conditions previously referred to. The second zone of the catalyst will, therefore, constitute a region of high temperature. Since the concentration of product in this zone has practically reached the limit set by the high temperature, conversion brought about by the balance of the catalyst will be limited by the extent to which the gases are allowed to cool in contact with it and are thus brought into regions where the equilibrium conditions are more favorable. However, the tendency may be for the gases to cool too much, i. e., below the temperature at which the catalyst is effectively active; so that it may be that comparatively little conversion is effected in at least the latter part of the third zone of catalyst. Thus, in the case of the example of ammonia synthesis operation described above, the temperature was below 500° C. in the last 15 per cent. of the catalyst tube, and this temperature ordinarily is too low for efficient carrying out of the reaction.

Those portions of the catalyst that are subjected to the highest temperatures may be expected to be the first to suffer deterioration. As the activity of the first portion of the catalyst decreases, the next portion will gradually become the zone of high conversion and high temperature. When this in turn becomes inactive, the zone of high temperature will be transferred to a succeeding portion, and so on. It will be seen that thus the catalyst may all eventually be rendered inactive and, as the process of deterioration goes on, progressively smaller amounts of active catalyst will be available to the gases contacting therewith.

It should be apparent from the foregoing that the question of temperature distribution within the catalyst, particularly as related to the removal of heat from the hot zone and the maintenance of temperature in the latter portions of the succeeding zone, is very important, the ideal condition to be sought being that in which the temperature is maintained uniform throughout the length of the catalyst container.

It has been proposed heretofore to cool the catalyst by a fluid moving in a direction opposite to that of the reacting gases; this scheme has been used largely, I believe, because the idea of counter current flow is commonly employed in heat exchanger design. The cooling fluid, when so used, aggravates the adverse conditions above mentioned because the coldest zone of the catalyst is cooled below the temperature which it would attain naturally and the cooling fluid is already too highly heated before it reaches the heated zone from which heat should be removed.

It is the object of the invention to provide a method of and apparatus for conducting catalytic exothermic gaseous reactions wherein the temperature of the catalyst is maintained approximately uniform by the distribution of heat therein. Other objects and advantages will be understood by reference to the following specification and the accompanying drawings in which Figure 1 is a cross-sectional view of one type of apparatus adapted for the practice of the invention.

I have discovered that it is doubly advantageous to cause the cooling fluid to flow in the same direction as that of the reacting gases. This has the advantage, on the one hand, of directing the cold fluid first, not upon the normally cooler portion of the catalyst (the third zone above mentioned), but upon the hot zone, from which removal of heat is desirable in order that the bad effects of high temperature previously referred to may not be produced. It has an advantage, on the other hand, with respect to the third catalyst zone. Here the problem is largely one of heat conservation rather than heat removal since, as I have already pointed out, the tendency may be for the gases and the catalyst to cool off so much that the reaction velocity becomes too low to permit of efficient conversion. By causing the cooling agent to move in the same direction as the reacting gases, not only is heat more effectively removed from the hot zone, but there is less tendency for the fluid to cool excessively that zone of the catalyst in which heat should be conserved. In other words, my invention tends to eliminate simultaneously the too hot and too cool zones of the catalyst by the transfer of heat from one to the other and to approach thereby the ideal condition previously referred to, in which the temperature of the catalyst would be uniform throughout.

Since the invention depends upon the active transfer of heat to the cooling medium from the hottest zone of the catalyst, the former must be brought into heat exchange relation with the latter under conditions which facilitate heat transfer. The cooling medium may be passed through or about the catalyst though not in contact therewith. That is to say, for the cooling to be most effective, the wall of the catalyst container should not be too thick nor of a material of too low a thermal conductivity. Under some conditions of operation it may be that the gases as they first contact with the wall of the catalyst container will be so cold as to chill part, or all, of the catalyst to an undesirable extent. This condition can be remedied by regulating the heat exchange; for example, by preheating the gases; by altering the dimensions of the catalyst container so that the surface for thermal contact is lessened; by modifying the thickness of the container wall as a whole or in part; or by applying insulation to a part, or all, of the catalyst container surface. I have found, however, that the objects of my invention cannot be successfully attained if the heat exchange is modified by the interposition of another gaseous stream between the cooling medium and the catalyst. The term "immediate" heat exchange is employed in the accompanying claims to distinguish from heat transfer through such an intermediate gaseous stream. The term "heat exchange relation" as used herein may involve merely "indirect contact" under conditions and in zones where there is no temperature gradient.

The method of conducting catalytic exothermic gaseous reactions as herein described can be carried out in a variety of different types of apparatus. The apparatus should, however, provide for the introduction of the relatively cool gaseous mixture in heat exchange relation but not in direct contact with the catalyst near the point where the gaseous mixture eventually contacts with the catalyst and where the reaction is actively initiated; that is to say, the cooled entering gaseous mixture should be used to absorb heat from that zone of the catalyst which normally tends to reach the highest temperature and should pass in the same direction as that followed by the gases undergoing reaction toward the normally cooler end of the catalyst. By following this course the relatively cool entering gaseous mixture absorbs heat rapidly at the point in the catalyst where the greatest amount of heat is released. When the entering gaseous mixture reaches the successive zone of the catalyst where there is no surplus heat, it has already reached a temperature at which it will no longer act as a cooling agent for the catalyst and will, under certain conditions, give up heat to the catalyst at this zone, thus tending to produce a uniformity of temperature throughout the catalyst mass. In thus passing in heat exchange relation with the catalyst, the entering gaseous mixture tends to acquire that temperature at which it should be introduced to the catalyst in order that the reaction may start immediately upon contact of the gas therewith. The approach to this desired initial temperature as well as the further distribution of the heat can be accomplished by again passing the entering gaseous mixture in heat exchange relation but not in direct contact with the catalyst. Thus, if the entering gaseous mixture leaving the last zone of the catalyst is still at a higher temperature than the catalyst in that zone, it will, upon again passing in heat exchange relation therewith, give up a portion of its heat; and by the time that it reaches the zone of the catalyst where the reaction is most violent, it will be in condition again to absorb further quantities of heat before directly contacting with the catalyst.

As an example of the type of apparatus to be employed, the catalyst can be enclosed within a suitable receptacle which is in turn disposed within a chamber surrounded by a pressure-sustaining wall. The entering gaseous mixture can be introduced through a suitable tube and distributed by other tubes through the body of the catalyst without contacting therewith. After passing through the latter tubes the gaseous mixture can be caused to circulate about the catalyst container in the space between the container and the pressure-sustaining wall, and after passing thus in heat exchange relation with the catalyst it can be delivered thereto so that it will again pass through the catalyst in direct contact therewith and in the same direction which it followed originally. A suitable tube can be provided with an inlet at the opposite end of the catalyst to receive the gaseous products of the reaction and to permit withdrawal thereof.

A suitable apparatus is illustrated in the drawings, in which Fig. 1 is a sectional view through an apparatus for practicing the invention, and Fig. 2 is a horizontal sectional view through the catalyst chamber.

In the drawings A indicates a pressure-sustaining wall enclosing a catalyst container B with a plurality of tubes C extending therethrough and communicating with an inlet D. An outlet tube E also extends through the catalyst chamber in concentric relation with the inlet B. This latter tube terminates near the end of the catalyst chamber and is open to permit the escape of the gaseous products of the reaction. In this apparatus the gaseous mixture enters through the inlet D and passes through the tubes C in heat exchange relation with the body of the catalyst, and being at the lowest temperature at that end of the catalyst where the reaction is most active, the gaseous mixture will absorb the surplus heat therefrom. After escaping from the tubes C the gaseous mixture passes into the space F between the catalyst container and the pressure-sustaining wall and passes therethrough to the openings G which admit the gaseous mixture to the catalyst, and if the gaseous mixture enters the catalyst at a temperature lower than that existing in the hottest zone a portion of the heat evolved therein will be conveyed thereby from that zone. It will be seen that in this apparatus the entering gaseous mixture initially passes in indirect contact with the catalyst and in the same direction which it follows eventually during the reaction, and that heat absorbed at the hotter end of the catalyst can be distributed in the colder end, thus tending to maintain a uniform temperature throughout the catalyst body.

For the sake of convenience in temperature control, the reaction may be carried out in such a way that the tendency is for the incoming gases to reach the catalyst at a temperature slightly less than the lowest permitting the active commencement of the reaction. The balance of the heat required may be imparted to the gases from an external source, for example, by means of an electrical heating coil H. It may be necessary to use such a coil either continuously or intermittently, depending upon the heat evolved in the reaction, the radiation losses, the efficiency of heat exchange, etc.

While the apparatus as described is well adapted for the accomplishment of the purpose of the invention, it should be understood that various modifications thereof are possible to permit the distribution of heat in the catalyst body and that various changes can be made in the apparatus and in the operation thereof as hereinbefore described without departing from the invention or sacrificing any of the advantages thereof.

I claim:

1. In an apparatus for effecting catalytic exothermic gaseous reactions, the combination of a catalyst container having an inlet for the gases to react near one end thereof, a catalyst therein, means within the catalyst to convey a cooling medium in heat exchange relation but out of contact therewith, and means for delivering the cooling medium to the first-mentioned means adjacent said inlet.

2. In an apparatus for effecting catalytic exothermic gaseous reactions, the combination of a pressure-sustaining wall, a catalyst container within and spaced from the pressure-sustaining wall and having an inlet for the gases at one end thereof communicating with the space between the pressure-sustaining wall and the catalyst container, a catalyst in the container, means within the catalyst to convey gases in heat exchange relation but out of contact therewith and means for delivering the gases to the first-mentioned means adjacent said inlet, the first-mentioned means having an outlet to the space between the pressure-sustaining wall and the catalyst container.

3. In an apparatus for effecting catalytic exothermic gaseous reactions, the combination of a pressure-sustaining wall, a catalyst container within and spaced from the pressure-sustaining wall and having an inlet for the gases at one end thereof communicating with the space between the pressure-sustaining wall and the catalyst container, a catalyst in the container, means within the catalyst to convey gases in heat exchange relation but out of contact therewith, means for delivering the gases to the first-mentioned means adjacent said inlet, the first-mentioned means having an outlet to the space between the pressure-sustaining wall and the catalyst container, and means communicating with the catalyst at the end of the container remote from said inlet to discharge the gases therefrom.

4. In an apparatus for effecting catalytic exothermic gaseous reactions, the combination of a pressure-sustaining wall, a catalyst container within and spaced from the pressure-sustaining wall and having an inlet for the gases at one end thereof communicating with the space between the pressure-sustaining wall and the catalyst container, a catalyst in the container, means within the catalyst to convey gases in heat exchange relation but out of contact therewith, means for delivering the gases to the first-mentioned means adjacent said inlet, the first mentioned means having an outlet to the space between the pressure-sustaining wall and the catalyst container, and means within and communicating with the catalyst at the end of the container remote from said inlet to discharge the gases therefrom.

5. A pressure-sustaining shell enclosing a catalyst container spaced therefrom and a conduit extending through said catalyst container communicating at one end with a source of gases to react and at the other with the annular space between the pressure-sustaining shell and the catalyst container, the catalyst container having an opening at the opposite end of said annular space communicating therewith.

6. A method of effecting catalytic exothermic gaseous reactions in which the gases to undergo reaction pass through an extended body of the catalyst, which comprises passing the gases to undergo reaction through the catalyst from the zone of most intense heat, where the gases absorb heat from the catalyst, to a zone of less intensity, the gases during such passage being out of actual contact with the catalyst, passing said gases from the zone of less intense heat back to the zone of most intense heat while still maintaining them in heat-exchange relation with the catalyst, but out of contact therewith, introducing the gases into actual contact with the catalyst and causing them to pass therethrough, and withdrawing the products of the reaction in heat-exchange relation with the incoming gases.

7. The method of effecting catalytic exothermic gaseous reactions, which comprises heating the gases by heat exchange with outgoing products, conveying the gases within the catalyst in heat exchange relation but out of contact therewith and in the direction of travel of the gases undergoing reaction, thence in the opposite direction out of contact with the catalyst and thereafter into contact with the catalyst.

8. The method of effecting catalytic exothermic gaseous reactions, which comprises conveying the gases within the catalyst in heat exchange relation but out of contact therewith and in the direction of travel of the gases undergoing reaction, thereafter into direct contact with the catalyst and withdrawing the products of the reaction after passage thereof in heat exchange relation but out of contact with the catalyst.

9. The method of effecting catalytic exothermic gaseous reactions, which comprises heating the gases by heat exchange with the outgoing products, conveying the gases within the catalyst in heat exchange relation but out of contact therewith and in the direction of travel of the gases undergoing reaction, thereafter into direct contact with the catalyst and withdrawing the products of the reaction after passage thereof in heat exchange relation but out of contact with the catalyst.

10. The method of effecting catalytic exothermic gaseous reactions, which comprises conveying the gases within the catalyst in heat exchange relation but out of contact therewith and in the direction of travel of the gases undergoing reaction, thence in the opposite direction out of contact with the catalyst, thereafter into direct contact with he catalyst and withdrawing the products of the reaction after passage thereof in heat exchange relation but out of contact with the catalyst.

In testimony whereof I affix my signature.

FRANK C. BLAKE.